United States Patent [19]

Kuehn

[11] 4,283,798
[45] Aug. 18, 1981

[54] ATTITUDE INDICATOR FOR DIVERS

[75] Inventor: Lorne A. Kuehn, Downsview, Canada

[73] Assignee: Her Majesty the Queen in right of Canada, as represented by the Minister of National Defence, Ottawa, Canada

[21] Appl. No.: 62,627

[22] Filed: Aug. 1, 1979

Related U.S. Application Data

[62] Division of Ser. No. 887,771, Mar. 17, 1978, Pat. No. 4,172,327.

[30] Foreign Application Priority Data

Apr. 22, 1977 [CA] Canada .................................. 276795

[51] Int. Cl.³ .............................................. A61F 9/02
[52] U.S. Cl. .......................................... 2/426; 33/333;
33/366; 362/105; 340/573; 340/689
[58] Field of Search ................ 2/2.1 R, 422, 428, 426;
362/105, 106; 340/573, 689; 33/333, 366

[56] References Cited

U.S. PATENT DOCUMENTS

| 669,949 | 3/1901 | Underwood | 362/105 |
|---|---|---|---|
| 902,216 | 10/1908 | Drager | 362/106 X |
| 1,409,808 | 3/1922 | Wood | 33/333 X |
| 3,210,859 | 10/1965 | Fisk et al. | 33/333 |
| 4,092,704 | 5/1978 | Malm | 362/106 |

Primary Examiner—Charles E. Phillips
Attorney, Agent, or Firm—Stevens, Davis, Miller & Mosher

[57] ABSTRACT

A device for enabling a diver to determine his relationship to the true horizon in deep and murky waters or when physiological sensations are of little value is described. An attitude sensor, incorporating a series of mercury switches, usually at the back of the diver's helmet or head, is coupled to a series of light emitting diodes equally spaced around the periphery of the face plate of the diving mask or helmet so as to simulate the natural observation that the half space above the horizon is illuminated while the half space below the horizon is not.

3 Claims, 6 Drawing Figures

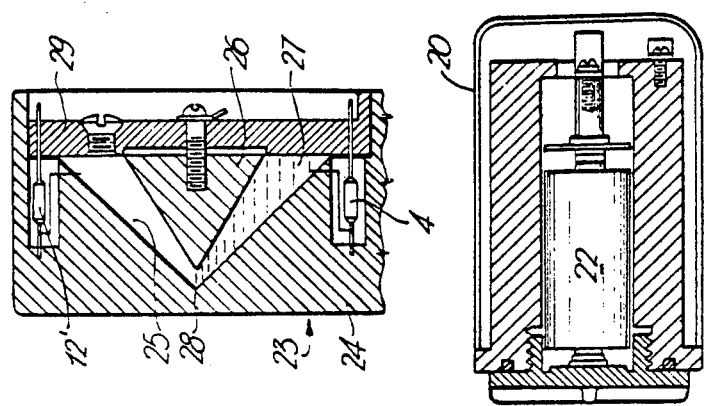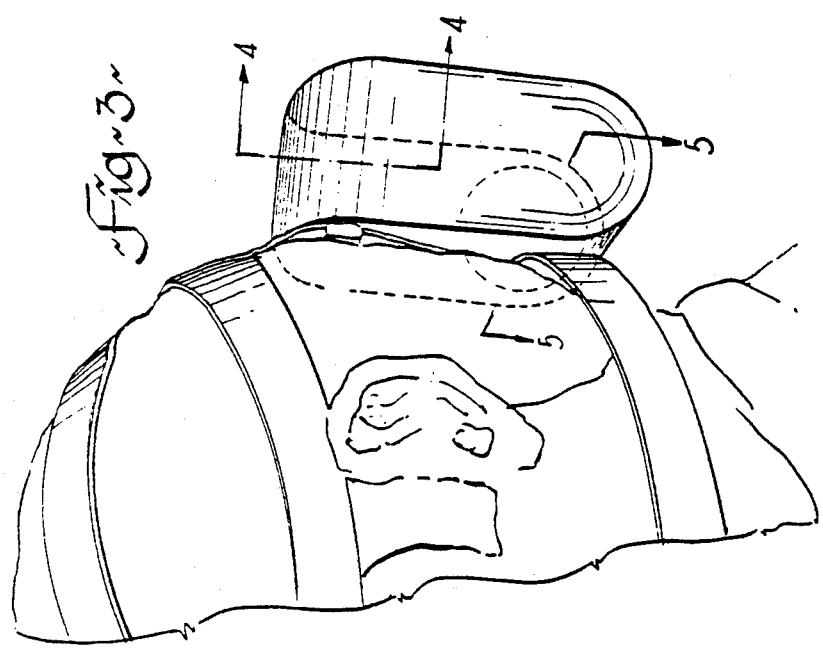

ATTITUDE INDICATOR FOR DIVERS

This is a division of application Ser. No. 887,771 filed Mar. 17, 1978, now U.S. Pat. No. 4,172,327.

This invention relates to diving apparatus and more particularly to an attitude sensor for divers or the like.

BACKGROUND OF THE INVENTION

Military and commercial divers are frequently deployed from diving bells and lockout submersibles at very great depths at which the water is frequently very dark and murky. In such a deployment is is essential that the diver should not stray too far above or below the bell or submersible. If he does move out of a very rigidly defined safe depth "window" he is liable to suffer either explosive decompression to the surface (the bends) or "chokes" and suffocation. It is important therefore that the diver should, at all times, have an awareness of the aspect of the true horizon and his relationship to it, i.e. whether he is right side up or upside down, leaning forward or falling backward, etc. Such information is not normally available to the diver as light from above does not reach him and his own physiological sensations are masked because he is usually in a freely buoyant or suspended state.

Heretofore the problem has been overcome by the provision of bright lights suspended from or emanating from the diving bell or submersible, but there remains the not inconsiderable risk that these lights may fail or the water is so murky that the diver cannot see the lights sufficiently clearly for proper orientation. Even if the diver is himself equipped with lights it is often the case that he cannot determine the direction of the horizon or true vertical and he is then in great danger or sinking or rising out of his safe depth or pressure window.

SUMMARY OF THE INVENTION

It is an object of the present invention to provide a device suitable for attachment within a diver's mask or helmet, which will provide a peripheral indication of the diver's attitude with respect to the true horizon. It will be of use also to the diver who desires attitude information at shallower but also dark depths and in this application it is not restricted just to divers supported by a diving bell, habitat or submersible.

Thus by one aspect of this invention there is provided an attitude indicator for attachment to a movable body and operable connection to a power supply means, said indicator comprising:

(a) attitude sensor means including a plurality of gravity operated switches each actuated at a different attitude of said movable body; and (b) display means actuated by said switches and co-related therewith to indicate visually the attitude of the movable body in response to actuation of selected ones of said witches.

BRIEF DESCRIPTION OF THE DRAWING

The invention will be described in more detail hereinafter with reference to the drawings in which:

FIG. 3 is an enlarged isometric view of the sensor shown in FIG. 1;

FIG. 4 is a section of the sensor shown in FIG. 3 taken along line 4—4;

FIG. 5 is a section of the sensor shown in FIG. 3 taken along line 5—5; and

DESCRIPTION OF THE PREFERRED EMBODIMENT

Figure 1:
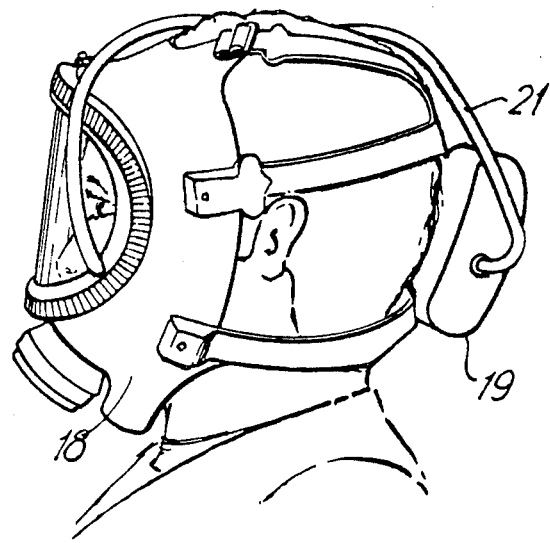
FIG. 1 is a side view of a diver wearing a mask of the present invention and showing the attitude sensor, (it is not intended that the use of the device be restricted to such diving as portrayed here, for example, it also pertains to divers wearing helmets and "dry" suits)
Figure 2:
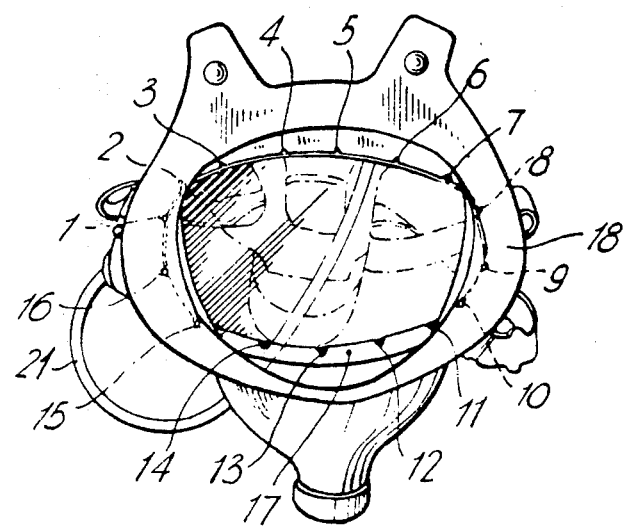
FIG. 2 is a rear view of a mask of the present invention showing the light emitting diodes.
Figure 6:
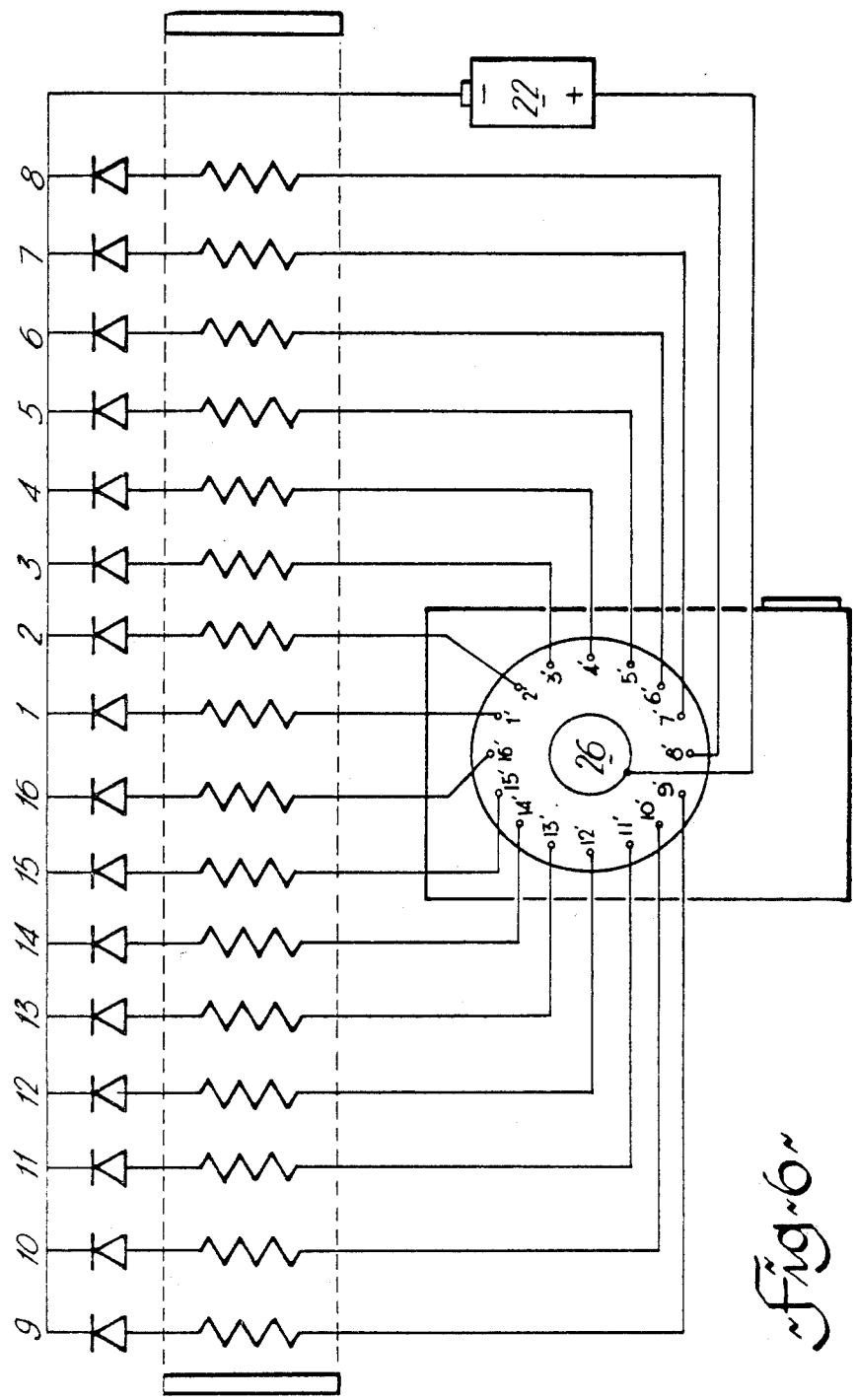
FIG. 6 is a schematic circuit diagram showing the electrical connections in the device of the invention.

As will be appreciated, the natural observation is that the half space above the horizon is illuminated whereas the half space below the horizon is not. When a diver is in the normal upright position as indicated in FIG. 1, the upper light sources, such as light emitting diodes (LEDs) 1-8 in the display ring 17 on the inside of the diver's face plate 18 will be illuminated and the lower LEDs 9-16 will be extinguished. It is then desirable if the diver is upside down for the lower LEDs 9-16 to be illuminated and for the upper LEDs 1-8 to be extinguished thereby enabling the diver to have a constant horizon reference. If the diver is horizontal and face-down in the water it is desirable for all LEDs 1-16 to be extinguished and if the diver is horizontal and face-up for all LEDs 1-16 to be illuminated. It is obvious that intermediate positions can also be indicated by illumination of the appropriate LEDs. The desired display, depending upon attitude can be readily achieved if the LEDs are connected, as shown more clearly in FIG. 6, to a novel attitude sensor 19 shown most clearly in FIGS. 1, 3, 4 and 5, which can be conveniently, but not essentially, attached to the back of the diver's mask or helmet and located at the back of the diver's head, as shown in FIG. 1. It will be appreciated that the sensor 19 which is contained in a waterproof housing 20 and connected by a waterproof cable 21 to the display ring 17 can also be located on the diver's back or attached to his belt or the like.

As shown in FIGS. 3, 4 and 5, sensor 19 is housed in a waterproof housing 20, for example neoprene, which conveniently but not essentially also contains a power supply 22, conveniently but not essentially a pair of 2.7 volt E132N Eveready ® Mercury Energizer batteries. It is possible that the power supply could be housed elsewhere on the diver's person or even remotely connected to an instrument package. These batteries are rated at 1000 mah thereby providing about 10-20 hours of continuous operation for the preferred low power MV55 (Monsonto: 1.6 volts/2 ma) LEDs used. Although no on-off switch is shown in the drawings, it will be appreciated that one may be incorporated thereby avoiding the necessity of removing the battery when the unit is not in use.

The sensor 19 comprises a mercury switch 23 of novel design with the associated power supply 22. The switch 23 comprises a body portion 24, conveniently made of a castable resin such as an epoxy resin, having a right conical depression 25 therein. A cone 26, fabricated in an electrically conducting material, is axially mounted in and partially fills the depression 25 and forms a common electrode. In the embodiment shown in FIG. 4, around the perimeter of the base of the conical depression 25 in body 24 there are sixteen equally spaced electrodes of which only electrodes 4' and 12' are visible in section 4—4 of FIG. 4. It will, of course, be appreciated that any number of electrodes may be employed. Each of electrodes 1' to 16' penetrate into the space 25 and can be electrically connected to its corresponding LED 1 to 16, as appropriate, by means of a small quantity of mercury 27 which is contained in and approximately half fills the space 25. As shown in FIG. 4, when the diver is in the normally upright position as shown in FIGS. 1 and 3, the mercury in space 25 flows into the lower portion of the space and adjacent electrodes 1'–8' thereby completing the circuits with LEDs 1–8 via common electrode 26. If the diver were to be inverted it is apparent that the mercury will flow, under gravity, to that portion of the space adjacent electrodes 9'–16' and hence illuminating LEDs 9–16 respectively which will again provide the diver with a visual indication of the true horizon and vertical. Clearly if the diver is in a face-down position the mercury will flow to a position adjacent the apex 28 of conical space 25 and no electrical contact between electrodes 1'–16' and common electrode 26 is possible. Conversely if the diver is in a face-up position, the mercury will flow to a position adjacent the base 29 and electrical contact between all sixteen of electrodes 1'–16' and the common electrode 26 is achieved thereby illuminating all sixteen LEDs 1–16. For the purposes of the present specification each separate connection between common electrode 26 and an individual electrode 1–16 may be defined as a separate switch, so that the sensor 19 may be defined as comprising a plurality of gravity operated switches.

It will, of course, be appreciated that many modifications to the present invention may be made without departing from the essential scope thereof. For example, specific reference has been made herein to the use of light emitting diodes to provide the visual display but clearly many other forms of illuminated display could also be employed. Although reference has been made to a pool of mercury 27, common electrode 26 and a plurality of electrodes 1–16, clearly individual small pools of mercury may be employed each with a pair of electrodes in separate mercury switches to make up the desired plurality of gravity operated switches. Similarly although reference has been made to use of this device by an underwater swimmer using SCUBA equipment it will be appreciated that the device is equally applicable to a helmeted diver, and indeed to other environments requiring an accurate indication of attitude.

I claim:

1. Diver's headwear comprising a body portion having means for securing it to a person's head;
   a window opening in said body portion, to be positioned in use so as to enable the diver to see through it;
   a transparent window sealedly mounted in said window opening; and
   a multiplicity of illuminating means disposed peripherally of said window opening, said illuminating means being connectible to an electrical circuit to energize the illuminating means selectively, illumination from the selectively energized illuminating means simulating natural daylight from above to the diver when underwater, thereby enabling said diver to sense visually and instinctively vertical and horizontal directions relative to his own orientation in the water.

2. The headwear defined in claim 1 including sensing means to be supported by the diver, said sensing means being gravity operated for selective energization of those illuminating means which indicate at that instant the vertical direction.

3. The headwear defined in claim 2, wherein said illuminating means comprises a multiplicity of light emitting diodes.

* * * * *